United States Patent [19]

Oshiage

[11] Patent Number: 4,718,012

[45] Date of Patent: Jan. 5, 1988

[54] CONTROL SYSTEM FOR DRIVE TRAIN INCLUDING CONTINUOUSLY VARIABLE TRANSMISSION

[75] Inventor: Katsunori Oshiage, Yokohama, Japan

[73] Assignee: Nissan Motor Co., Ltd., Yokohama, Japan

[21] Appl. No.: 737,021

[22] Filed: May 22, 1985

[30] Foreign Application Priority Data

May 23, 1984 [JP] Japan ................... 59-102641

[51] Int. Cl.$^4$ ............... B60K 41/18; G05B 11/42; G06G 7/25

[52] U.S. Cl. ................... 364/424.1; 74/866; 474/11; 474/70; 364/161

[58] Field of Search ............... 364/161, 164, 165, 182, 364/424.1; 74/866, 867; 474/11, 12, 18, 28.70; 192/0.055

[56] References Cited

U.S. PATENT DOCUMENTS

| | | | |
|---|---|---|---|
| 3,646,454 | 2/1972 | Southern | 364/161 |
| 4,008,386 | 2/1977 | Ross | 364/161 |
| 4,261,229 | 4/1981 | Mizuno et al. | 74/866 |
| 4,509,125 | 4/1985 | Fattic et al. | 364/424.1 |
| 4,515,040 | 5/1985 | Takeuchi et al. | 74/866 |
| 4,520,301 | 5/1985 | Suzuki | 364/161 |
| 4,567,265 | 3/1986 | Kumura et al. | 192/0.055 |

FOREIGN PATENT DOCUMENTS

| | | | |
|---|---|---|---|
| 140228 | 5/1985 | European Pat. Off. | 364/424.1 |
| 3023408 | 1/1982 | Fed. Rep. of Germany | 364/161 |
| 219346 | 2/1985 | German Democratic Rep. | 364/161 |

OTHER PUBLICATIONS

Merz, "Grundkurs der Regelungstechnik", Textbook, printed by R. Oldenbourg, Munich, Germany, 1964, pp. A/50 to A/67.

Primary Examiner—Felix D. Gruber
Attorney, Agent, or Firm—Schwartz, Jeffery, Schwaab, Mack, Blumenthal & Evans

[57] ABSTRACT

A control system for a motor vehicle drive train including a continuously variable transmission is disclosed wherein a command signal is generated in response to the sum of an integral control factor and a proportional control factor, and the integral control factor is suppressed to almost zero when a deviation of a reduction ratio representative parameter from a target value is greater than a predetermined value.

12 Claims, 5 Drawing Figures

CONTROL SYSTEM FOR DRIVE TRAIN INCLUDING CONTINUOUSLY VARIABLE TRANSMISSION

REFERENCE TO RELATED APPLICATION

Reference is made to the following co-pending U.S. patent application:

U.S. Ser. No. 659,699, filed Oct. 11, 1984 (corresponding to EP No. 84112096.7, filed Oct. 9, 1984).

BACKGROUND OF THE INVENTION

The present invention relates to a control system for a motor vehicle drive train including a continuously variable transmission.

Ratio control systems for continuously variable transmissions are well known in the art. Such a ratio control system is disclosed in co-pending U.S. patent application Ser. No. 411,987, filed Aug. 26, 1982 (now U.S. Pat. No. 4,515,040) which corresponds to European Patent Application No. 82 107 823.5. In this ratio control system, a target or desired reduction ratio is determined based on various input signals representative of varying vehicle operating conditions and a pulley unit, including a drive pulley, a driven pulley and a V-belt, is hydraulically controlled such that an actual reduction ratio is varied such that the deviation from the target reduction ratio is decreased.

Generally, continuously variable transmissions include a drive pulley, a driven pulley, a V-belt drivingly interconnecting such pulleys, a source of hydraulic fluid pressure, a pressure regulator valve for regulating the hydraulic fluid pressure to develop a control pressure variable with actual reduction ratio and engine's load (induction manifold), a hydraulic fluid network including a shift control valve establishing fluid interconnection among the regulator valve, drive pulley, and driven pulley for controlling fluid pressure supplied to the drive pulley relative to that supplied to the driven pulley so as to vary the reduction ratio in response to the position of an adjustable control member. The position of the adjustable control member is controlled by a microcomputer based control unit wherein a reduction ratio is varied such that the deviation of an actual reduction ratio from a target reduction ratio is decreased. The ratio control system of this kind is disclosed in co-pending U.S. patent application Ser. No. 543,838, filed Oct. 20, 1983 (corresponding to EP No. 83 110 546.5) now U.S. Pat. No. 4,576,265, issued Mar. 18, 1986.

In a ratio control system of the above kind, the deviation from the target reduction ratio is integrated and then multiplied with an integral gain to provide an integral control factor, and the deviation is multiplied with a proportional gain to provide a proportional control factor. The integral and proportional control factors are added to each other and, based on this result, a control unit generates a shift command signal to a shift actuator, such as a stepper motor, for adjusting the position of an adjustable control member.

Since the shift command signal is determined on the sum of integral control factor and proportional control factor, overshoot and hunting are caused when the deviation is large if the integral gain is set large enough to provide a fast response. On the contrary, if the integral gain is set small, there is provided a slow response. Therefore, the setting of the integral control gain is a compromise between drivability which requires fast response and stability which requires slow response.

SUMMARY OF THE INVENTION

An object of the present invention is to provide a control system for a motor vehicle drive train including a continuously variable transmission, which provides fast response without causing overshoot and hunting which would be caused if the integral control gain is set sufficiently large for fast response.

According to the present invention, there is provided a control system for a motor vehicle drive train including an engine and a continuously variable transmission drivingly connected to the engine, the continuously variable transmission having a shift actuator and being shiftable to a reduction ratio corresponding to operating position of the shift actuator, comprising:

means for determining a target value of a predetermined representative parameter variable with reduction ratio of the continuously variable transmission;

means for detecting an actual value of said predetermined representative parameter;

means for determining a deviation of the actual value from the target value and generating a deviation indicative signal;

means for integrating said deviation indicative signal to determine an integral control factor and generating an integral control factor indicative signal indicative of the integral control factor;

means for proportioning said deviation indicative signal to determine a proportional control factor and generating a proportional control factor indicative signal indicative of the proportional control factor;

means for generating a command signal in response to said integral control factor indicative signal and said proportional control factor and command signal; and means for substantially removing the integral control factor from said command signal when the absolute value of said deviation indicative signal is greater than a predetermined value.

According to another aspect of the invention, there is provided a control method for a motor vehicle drive train including an engine and a continuously variable transmission drivingly connected to the engine, the continuously variable transmission having a shift actuator and being shiftable to a reduction ratio corresponding to operating position of the shift actuator, comprising:

determining a target value of a predetermined representative parameter variable with reduction ratio of the continuously variable transmission;

detecting an actual value of said predetermined representative parameter;

determining a deviation of the actual value from the target value and generating a deviation indicative signal;

integrating said deviation indicative signal to determine an integral control factor and generating an integral control factor indicative signal indicative of the integral control factor;

proportioning said deviation indicative signal to determine a proportional control factor and generating a proportional control factor indicative signal indicative of the proportional control factor;

generating a command signal in response to said integral control factor indicative signal and controlling the shift actuator in response to the command signal; and substantially removing the integral control factor of said command indicative signal when the absolute value of said deviation indicative signal is greater than a predetermined value.

DESCRIPTION OF THE EMBODIMENTS

Referring to the accompanying drawings, the present invention is specifically described.

(FIRST EMBODIMENT)

Figure 1:
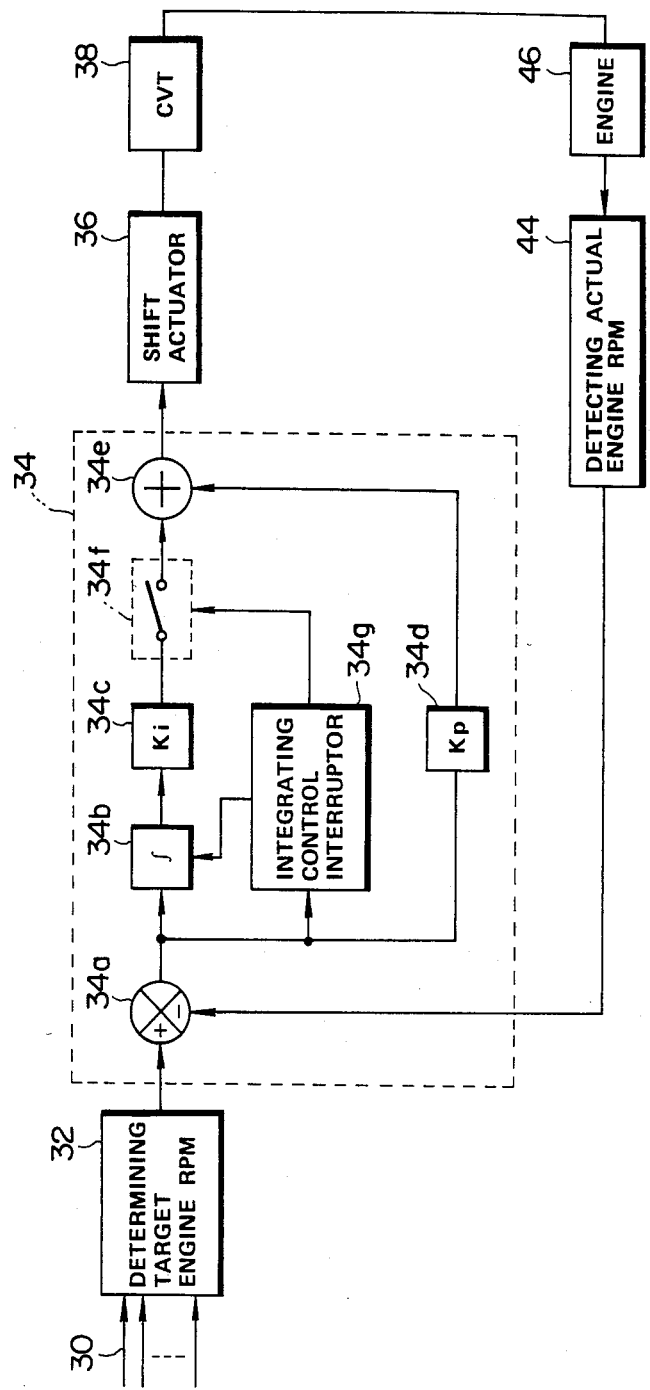
FIG. 1 is a schematic control block diagram showing a first embodiment.

Referring to FIG. 1, there is schematically shown a motor vehicle drive train comprising an engine 46, and a continuously variable transmission (CVT) 38 which is drivingly connected with the engine in the conventional manner. The transmission 38 is shiftable by a shift actuator 36 in a continuous manner. Since the reduction ratio of the transmission 38 is variable continuously, the engine 46 changes its speed continuously in response to a change in reduction ratio of the transmission 38. Reference numeral 30 designates various signals representing operating conditions of the motor vehicle. These signals 30 enter, as inputs, a target engine revolution speed determination block 32 which determines an engine revolution speed to be set as a target in response to the signals 30. Such engine revolution speed is determined in accordance with a predetermined shift (or speed ratio change) pattern. If the reduction ratio of the continuously variable transmission is controlled in accordance with the predetermined shift pattern, the engine operates on the minimum fuel consumption rate curve. The output signal of the target engine revolution speed determination block 32, which is indicative of the target engine revolution speed, is applied, as an input, to be feedback controller 34. In a manner later described, the feedback controller 34 generates a command signal indicative of a reduction ratio with which the target engine revolution speed is achieved, and the command signal is applied to the shift actuator 36. The shift actuator 36 is moved to the operating position corresponding to the reduction ratio set as the target in response to the command signal and adjusts in a conventional manner the reduction ratio of the continuously variable transmission. Because it is drivingly connected to the continuously variable transmission 38, the engine 48 changes its speed in response to a change in reduction ratio established in the continuously variable transmission 38. The engine speed of the engine 46 is detected by an actual engine speed detector 44, and the output signal indicative of the actual engine speed is supplied to the feedback controller 34. Regarding the mounting site of the engine speed detector 44, it is preferrable to detect the revolution speed of the output side member of the engine, such as the transmission input shaft, for the purpose of reducing an error due to slip within a hydraulic fluid coupling or a hydraulic torque converter in the case where such hydraulic unit is disposed between the engine 46 and the transmission 38.

The feedback controller 34 operates as follows: At a summing point 34a, a deviation is determined by substracting the actual engine revolution speed from the target engine revolution speed. The output indicative of the deviation is integrated by an integrator 34b, and the output of the integrator 34b is multiplied with an integral gain Ki at a multiplier 34c. The result obtained by the multiplier 34c enters a summing point 34e via a switch 34f. The switch 34f is actuated by the output of an integrating control interruptor 34g. On the other hand, the deviation is multiplied with a proportional gain Kp at another multiplier 34d. The result obtained at the multiplier 34e enters the summing point 34e where the signals from the switch 34f and multiplier 34d are added to each other, and the result is output to the shift actuator 36. According to the integrating control interruptor 34g, the switch 34f is kept turned ON when the absolute value of the deviation from the summing point 34a is less than a predetermined value, while when the deviation is greater than the predetermined value, the switch 35f is turned OFF and the integrator 34b is cleared to an initial value (for example, 0). Thus, in the case the deviation of the actual engine revolution speed from the target engine revolution speed is less than the predetermined value, the switch 34f is turned ON and thus the output signal of the multiplier 34c is added to the output signal of the multiplier 34d, and the result is used to determine a shift command signal for actuating the shift actuator 36. On the other hand, in the case the absolute value of the deviation is greater than the predetermined value (for example, at rapid acceleration), the integrator 34b is cleared and the switch 34f is turned OFF, so that the signal for actuating the shift actuator 36 is determined based only on the proportional control factor. Thus, even if a large value is set as the integral gain Ki, overshoot and hunting will not take place because the integral gain Ki is not added when the deviation is greater than the predetermined value.

Figure 2:
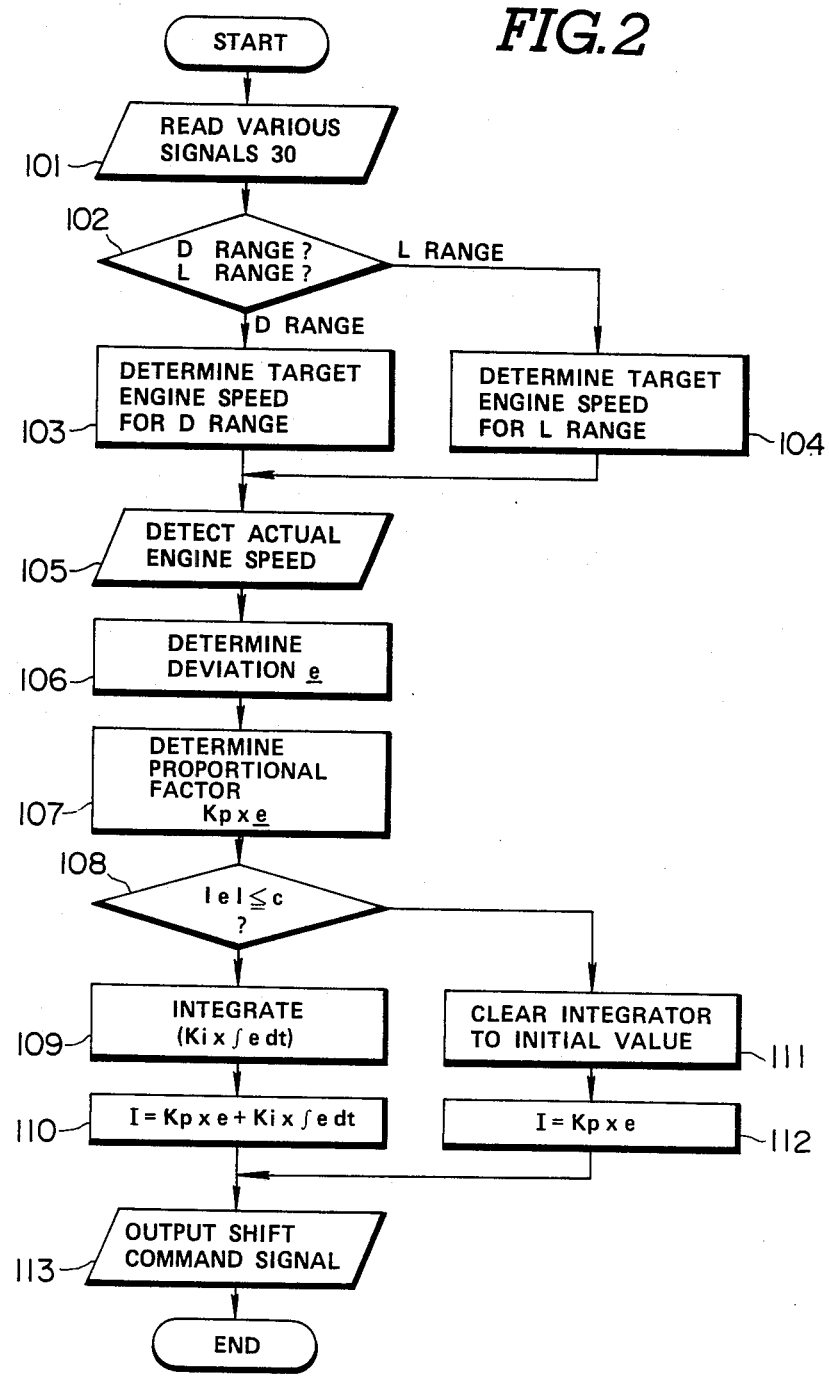
FIG. 2 is a flowchart implementing the operation of the first embodiment by a microcomputer based control system.

The above mentioned control may be implemented by a microcomputer based controller. The control flowchart is depicted in FIG. 2. First of all, various signals 30 representing operating condition of the vehicle are read (step 101), decision is made whether the select lever is pointed at D range or L range (step 102), a target engine revolution speed for D range is determined when the select lever is pointed at D range (step 103), and a target reduction ratio of L range is determined when the select lever is pointed at L range (step 104). A deviation e of the actual engine revolution speed from the target engine revolution speed is determined by arithmetic operation (step 106). A proportional control factor for feedback operation is determined by arithmetic operation (step 107). Decision is made whether or not the abolute value of the deviation is less than or equal to a predetermined value c (step 108). When it is less than or equal to the predetermined value, the control goes to step 109 where an integral control factor is determined by arithmetic operation (viz., the integral gain Ki is multiplied with the integral of the deviation e), then the result obtained in step 107 is added to the result obtained in the step 109 to provide a shift command signal for shift actuator (step 110), and then the shift command signal is output (step 113). When it is decided in step 108 that the absolute value of the deviation is greater than the predetermined value, the control goes to step 111 where the integrator is cleared to a predetermined initial value, then the result obtained in step 107 is set as the command signal for the shift actuator (step 112), and then this result is output as the command signal for shift actuator (step 113).

(SECOND EMBODIMENT)

Figure 3:
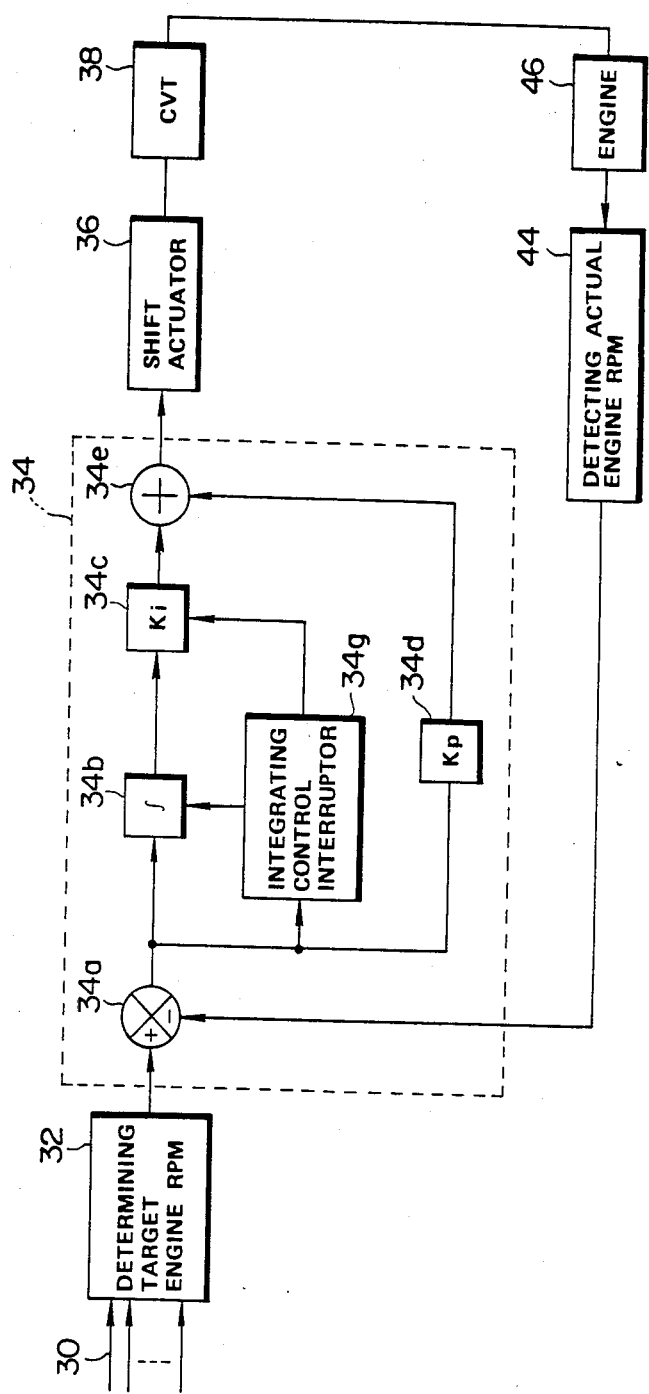
FIG. 3 is a similar view to FIG. 1 showing a second embodiment.

Referring to FIG. 3, a second embodiment is described. This embodiment is substantially the same as the first embodiment except the fact that the counterpart to the switch 34f shown in FIG. 1 has been eliminated, and the output signal of an integrating control interruptor 34g is fed to a multiplier 34c. The multiplier 34c is designed such that it sets an integral gain Ki to zero or a very small value in response to the output of the integrating control interruptor 34g. In this control arrangement, the output signal of the multiplier 34c decreases to zero or a very small value when the deviation is greater than a predetermined value. Thus, it provides substantially the same operation and effect as the first embodiment does.

(THIRD EMBODIMENT)

Figure 4:
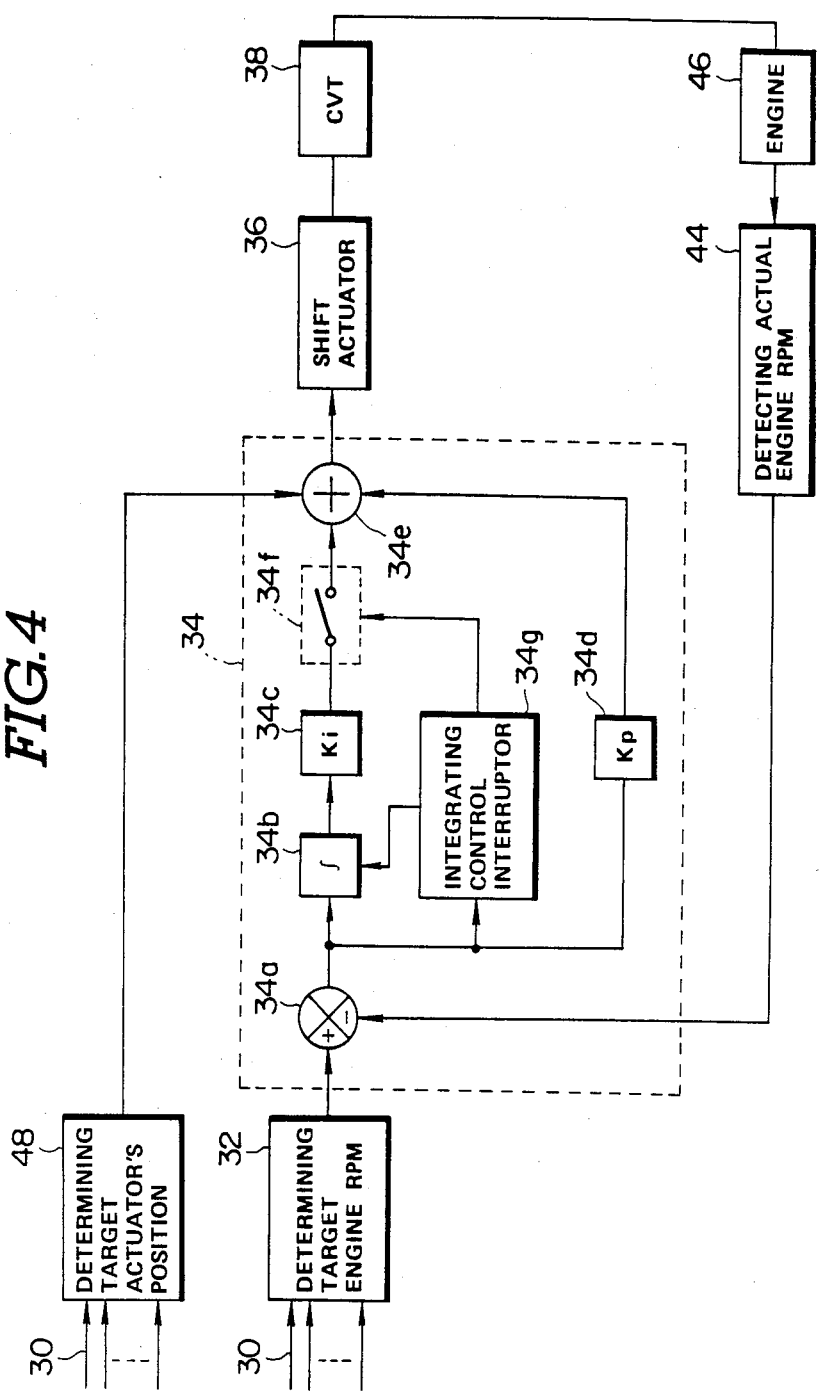
FIG. 4 is a similar view to FIG. 1 showing a third embodiment.

Referring to FIG. 4, a third embodiment is different from the first embodiment shown in FIG. 1 in the provision of a target actuator position determination block 48. The target actuator position determination block 48 determines an actuator's position to be set as a target based on various signals 30, and the output of the block 48 is fed, as an input, to a summing point 34e. The other control arrangement is the same as the control arrangement shown in FIG. 1. Briefly, in this third embodiment, a feedforward control is combined with the feedback control as shown in FIG. 1. Since, in this embodiment also, an integrating control interruptor 34g operates in the same manner as the counterpart of the first embodiment does, it provides substantially the same operation and effect as the first embodiment does. Since the feedforward control factor is added, the shift actuator 36 is actuated quickly as compared to the previously described embodiments.

(FOURTH EMBODIMENT)

Figure 5:
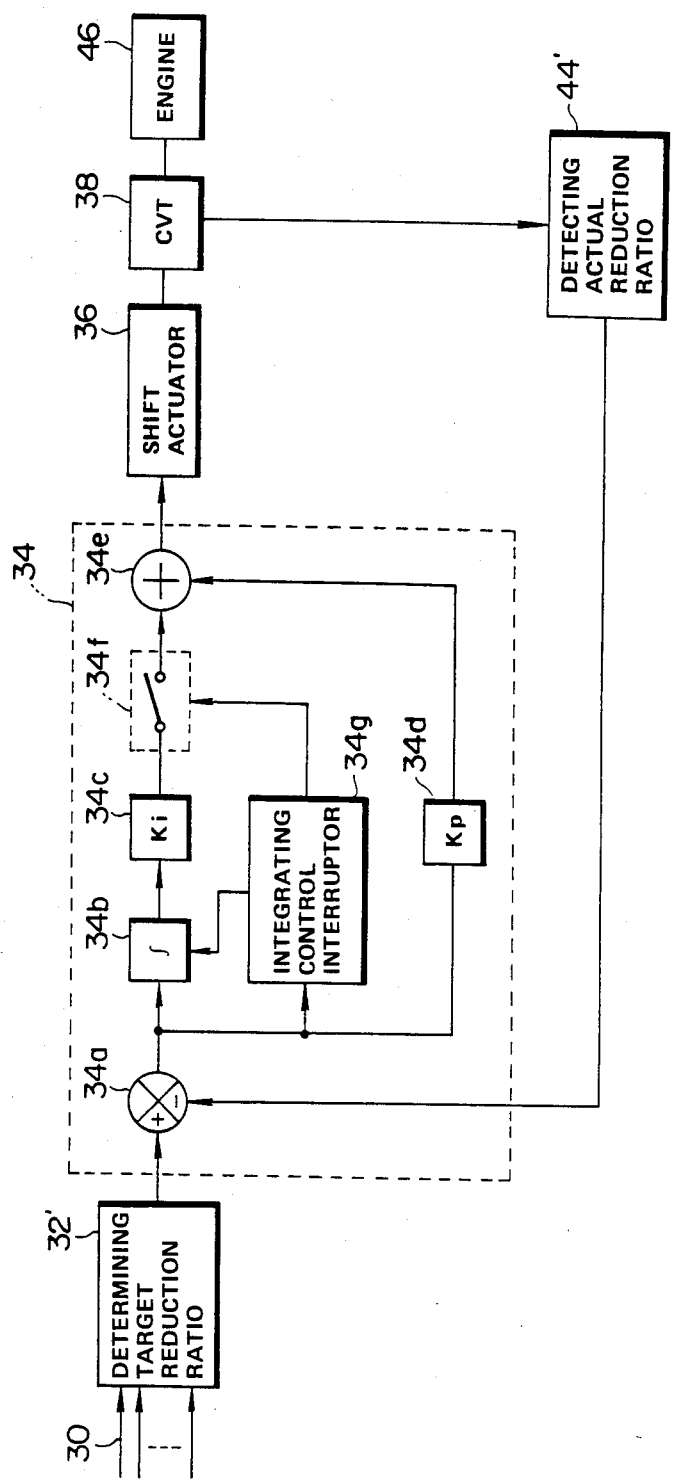
FIG. 5 is a simialr view to FIG. 1 showing a fourth embodiment.

Referring to FIG. 5, a fourth embodiment is described. This embodiment is different from the first embodiment shown in FIG. 1 in that the present invention is applied to a control system wherein a target reduction ratio determination block 32' and an actual reduction ratio detector 44' are used in the place of the block 32 and detector 44. More particularly, this embodiment is different from the first embodiment only in that the subject to be controlled has changed to reduction ratio from engine revolution speed. Thus, it provides substantially the same operation and effect as the first embodiment does. The subject to be controlled may be changed to the reduction ratio in the case of second and third embodiments shown in FIGS. 3 and 4, also.

What is claimed is:

1. A control system for a motor vehicle drive train including an engine and a continuously variable transmission drivingly connected to the engine, the continuously variable transmission having a shift actuator and being shiftable to a reduction ratio corresponding to an operating position of the shift actuator, comprising:
    means for determining a target value of a predetermined representative parameter which varies with the reduction ratio of the continuously varaible transmission;
    means for detecting an actual value of said predetermined representative parameter;
    means for determining a deviation of the actual value from the target value and generating a deviation indicative signal;
    means for integrating said deviation indicative signal to determine an integral control factor and generating an integral control factor indicative signal indicative of the integral control factor;
    means for producing a proportional control factor indicative signal which is proportional to said deviation indicative signal;
    means for generating a command signal in response to said integral control factor indicative signal and said proportional control factor indicative signal, said command signal having a first component based on said integral control factor indicative signal and having a second component based on said proportional control factor indicative signal and controlling the shift actuator in response to the command signal; and
    means responsive to said deviation indicative signal for adjusting said first component of said command signal such that said first component has a lower value when said deviation indicative signal has an absolute value which is greater than a predetermined value than when said deviation indicative signal absolute value is smaller than said predetermined value.

2. A control system as claimed in claim 1, wherein said predetermined representative parameter is the engine revolution speed.

3. A control system as claimed in claim 1, wherein said predetermined representative parameter is the reduction ratio of the continuously variable transmission.

4. A control system as claimed in claim 1, wherein said adjusting means causes said first component to be reduced to zero when said deviation indicative signal absolute value is greater than said predetermined value.

5. A control system as claimed in claim 1, wherein said adjusting means reduces the value of said integral control factor indicative signal when said deviation indicative signal absolute value is greater than said predetermined value.

6. A control system as claimed in claim 1, wherein said adjusting means reduces said integral control factor indicative signal to zero when said deviation indicative signal absolute value is greater than said predetermined value.

7. A control system as claimed in claim 1, wherein said integral control factor indicative signal generating means includes an integrator and said adjusting means clears said integrator to set an output of said integrator to an initial value when said deviation indicative signal absolute value is greater than said predetermined value.

8. A control system as claimed in claim 7, wherein said adjusting means prevents the entry of said integral control factor indicative signal to said command signal generating means when said deviation indicative signal absolute value is greater than said predetermined value.

9. A control system as claimed in claim 7, wherein said integral control factor indicative signal generating means includes a multiplier for multiplying an integral gain with the output of said integrator to generate said integral control factor indicative signal, and said adjusting means sets said integral gain to one of zero and a predetermined value near zero when said deviation indicative signal absolute value is greater than said predetermined value.

10. A control system as claimed in claim 8, wherein said command signal generating means is responsive also to said deviation indicative signal in generating said command signal.

11. A control system as claimed in claim 10, further comprising means for determining a target operating position of the shift actuator and generating an actuator's position control factor indicative signal, and wherein said command signal generating means is responsive also to said actuator's position control factor indicative signal.

12. A control method for a motor vehicle drive train including an engine and a continuously variable transmission drivingly connected to the engine, the continuously variable transmission having a shift actuator and being shiftable to a reduction ratio corresponding to an operating position of the shift actuator, comprising:

determining a target value of a predetermined representative parameter which varies with reduction ratio of the continuously variable transmission;

detecting an actual value of said predetermined representative parameter;

determining a deviation of the actual value from the target value and generating a deviation indicative signal;

integrating said deviation indicative signal to determine an integral control factor and generating an integral control factor indicative signal indicative of the integral control factor;

generating a proportional control factor indicative signal which is proportional to said deviation indicative signal;

generating a command signal having a first component based on said integral control factor indicative signal and having a second component based on said proportional control factor indicative signal and controlling the shift actuator in response to the command signal; and adjusting said first component of said command signal such that said first component has a lower value when said deviation indicative signal has an absolute value which is greater than a predetermined value than when said deviation indicative signal absolute value is smaller than said predetermined value.

* * * * *